Figure 1:
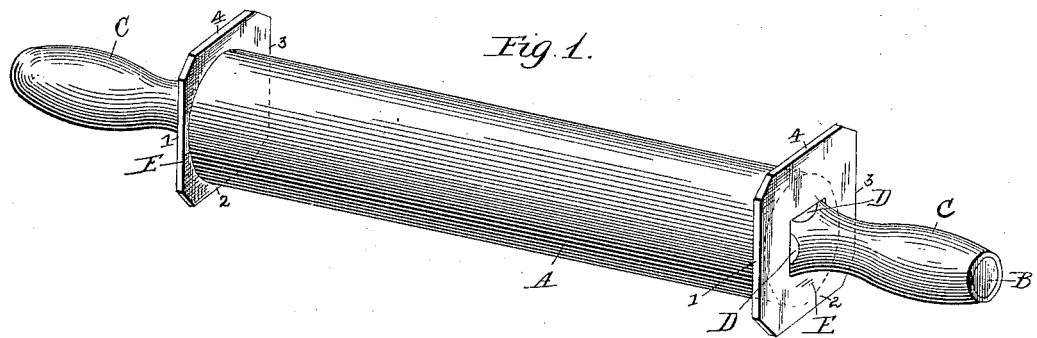

(No Model.)

L. CURTIS.
ADJUSTABLE ROLLING PIN.

No. 409,564. Patented Aug. 20, 1889.

WITNESSES

INVENTOR
Liddie Curtis,
by her attorney,
Franklin H. Hough

UNITED STATES PATENT OFFICE.

LIDDIE CURTIS, OF CALLICOON DEPOT, NEW YORK.

ADJUSTABLE ROLLING-PIN.

SPECIFICATION forming part of Letters Patent No. 409,564, dated August 20, 1889.

Application filed May 16, 1889. Serial No. 310,939. (No model.)

*To all whom it may concern:*

Be it known that I, LIDDIE CURTIS, a citizen of the United States, residing at Callicoon Depot, in the county of Sullivan and State of New York, have invented certain new and useful Improvements in Adjustable Rolling-Pins; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in rolling-pins; and it has for its object to provide a simple and efficient device of this character which may be quickly and easily adjusted so as to regulate the thickness of the dough when acted upon by the roller.

To this end and to such others as the invention may pertain the same consists in the peculiar combinations, and in the novel construction, arrangement, and adaptation of parts, all as more fully hereinafter described, shown in the drawings, and then specifically defined in the appended claims.

The invention is clearly illustrated in the accompanying drawings, which, with the letters of reference marked thereon, form a part of this specification, like letters of reference indicating like parts throughout the several views, and in which drawings—

Figure 2:
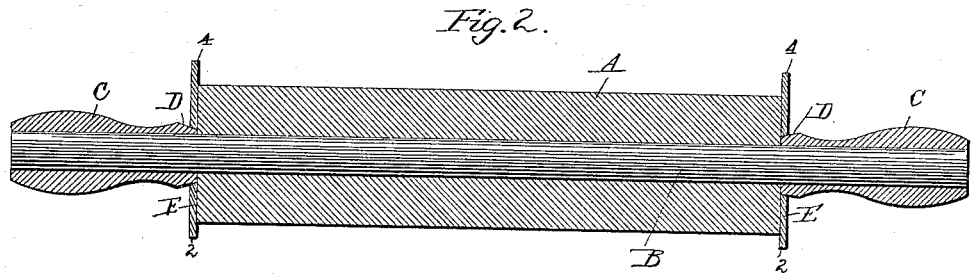
Figure 3:
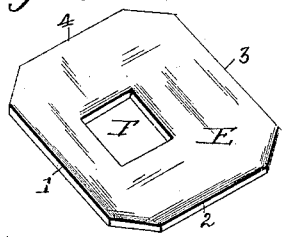

Figure 1 is a perspective view of a rolling-pin constructed in accordance with my invention. Fig. 2 is a vertical longitudinal section of the same, and Fig. 3 is a detail perspective view of one of the adjusting gage-blocks removed.

Reference now being had to the details of the drawings by letter, A designates the roller, which is sleeved upon the central shaft B and is rotatable thereon.

C C are the handles secured to the ends of the shaft B. The inner ends of the said handles adjacent to the roller A are provided with the rectangular or squared portions D.

E E are gage-blocks, which may be constructed of either wood, metal, or other substance adapted to the purpose. These gage-blocks, which are in all respects similar in form, are each provided with a squared aperture F, corresponding in size and form with the squared portions D of the handles, upon which they are designed to be fitted, as shown in the drawings. The gage-blocks are octagonal in form, with the several outer edges of the same at varying distances from the opening F, as indicated at 1, 2, 3, and 4 in Fig. 3 of the drawings.

The operation of the device will be readily understood from the foregoing description. If it is desired to roll a uniform and very thin sheet of dough, the rolling-pin is turned so as to cause the sides 1 of the gage-blocks to rest upon the table or rolling-board, when it will be seen that the roll in passing over the surface will be prevented from rolling the sheet less than the distance of the edge 1 from the outer periphery of the roll. Should a thicker sheet of dough be desired, the same may be produced by turning the device so as to present upon the lower side either of the edges 2, 3, or 4, as will be readily understood.

While in the present instance I have shown the gage-blocks E as octagonal, it is at once evident that a greater or less number of sides may be employed, and my invention contemplates the use of any of the various forms of blocks adapted to use in this connection.

Having thus described my invention, what I claim to be new, and desire to secure by Letters Patent, is—

1. The combination, with the roller and its shaft, of the gage-blocks at the ends of the roller, with their bearing-edges at varying distances from the acting surface of the roller, substantially as shown and described, and for the purpose specified.

2. The combination, with the roller and the shaft passed through the same, of the handles on the ends of the shaft and the gage-blocks upon the handles, having bearing-edges at varying distances from the bearing-face of the roller, substantially as shown and described.

3. The rolling-pin described, consisting of the shaft, the hollow roller rotatable thereon, the handles on the shaft provided with rectangular portions, and the gage-blocks having apertures to receive the rectangular portions of the handles and having their outer edges at varying distances from the apertures, substantially as shown and described, and for the purpose specified.

In testimony whereof I affix my signature in presence of two witnesses.

LIDDIE CURTIS.

Witnesses:
  JACOB KNIGHT,
  MARY E. KEEGAN.